United States Patent
Yoon et al.

(10) Patent No.: US 8,810,094 B2
(45) Date of Patent: Aug. 19, 2014

(54) LINEAR VIBRATION MOTOR

(75) Inventors: An Soo Yoon, Gyunggi-do (KR); Hwa Young Oh, Seoul (KR); Joon Choi, Gyunggi-do (KR); Kwang Hyung Lee, Gyunggi-do (KR); Jun Kun Choi, Gyunggi-do (KR)

(73) Assignee: Samsung Electro-Mechanics Co., Ltd, Gyunggi-Do (KR)

( * ) Notice: Subject to any disclaimer, the term of this patent is extended or adjusted under 35 U.S.C. 154(b) by 174 days.

(21) Appl. No.: 13/090,473

(22) Filed: Apr. 20, 2011

(65) Prior Publication Data

US 2012/0169149 A1    Jul. 5, 2012

(30) Foreign Application Priority Data

Dec. 30, 2010    (KR) .................. 10-2010-0138945

(51) Int. Cl.
*H02K 33/02*    (2006.01)
*H02K 33/18*    (2006.01)

(52) U.S. Cl.
USPC .................. 310/81; 310/12.16; 384/407.1

(58) Field of Classification Search
USPC ................ 310/13–37, 81; 340/384.73, 407.1, 340/388.1, 311.1; 381/152, 396
See application file for complete search history.

(56) References Cited

U.S. PATENT DOCUMENTS

| | | | |
|---|---|---|---|
| 7,999,421 B2 * | 8/2011 | Kim et al. | 310/15 |
| 2007/0194635 A1 * | 8/2007 | Miura | 310/15 |
| 2009/0121559 A1 * | 5/2009 | Lee | 310/28 |

FOREIGN PATENT DOCUMENTS

| | | | |
|---|---|---|---|
| CN | 101045229 A | | 10/2007 |
| JP | 2008048597 A | * | 2/2008 |
| KR | 10-2009-0066538 | * | 10/2009 |
| KR | 10 0923867 | * | 10/2009 |

OTHER PUBLICATIONS

JP 2008048597 machine translation Dec. 31, 2012.*
KR 10 0923867 machine translation Dec. 31, 2012.*
Office action dated Nov. 21, 2013 from corresponding Chinese Patent Application No. 201110109062.2 and its English summary provided by the clients.

* cited by examiner

*Primary Examiner* — Tran Nguyen
*Assistant Examiner* — Leda Pham
(74) *Attorney, Agent, or Firm* — Ladas & Parry, LLP

(57) ABSTRACT

Disclosed herein is a linear vibration motor. The motor includes a stator and a vibrator. The stator includes a magnet. The vibrator includes a coil facing the magnet. A weight is coupled to the coil. A PCB is connected to the coil and the stator. An elastic member is coupled to stator and the coil. A damper is provided on the weight at a position facing the elastic member. The damper may be provided between the elastic member and the weight or between the elastic member and the inner surface of a casing. The damper can mitigate metallic high frequency noise attributable to friction between the elastic member and the weight or between the elastic member and the casing. Furthermore, the spatial utilization is increased, thereby enhancing the degree of freedom in designing the linear vibration motor.

11 Claims, 4 Drawing Sheets

LINEAR VIBRATION MOTOR

CROSS REFERENCE TO RELATED APPLICATION

This application claims the benefit of Korean Patent Application No. 10-2010-0138945, filed Dec. 30, 2010, entitled "Linear vibration motor," which is hereby incorporated by reference in its entirety into this application.

BACKGROUND OF THE INVENTION

1. Technical Field

The present invention relates to a linear vibration motor.

2. Description of the Related Art

Generally, vibration motors convert electric energy into mechanical energy using the principle of generation of electromagnetic force. Such vibration motors are installed in electronic devices, such as mobile communication terminals, portable terminals, etc., and are used to indicate signal reception in a mute mode.

Furthermore, in accordance with the rapid growth of wireless communication and mobile phone markets, a variety of multifunctional mobile communication terminals have recently gained popularity. This trend requires high quality compact mobile communication terminals. To satisfy such requirements, techniques to improve the performance and quality of vibration motors have been developed.

Moreover, for several years, the number of cellular phones employing large screen LCDs and touch screens has increased rapidly. As a result, there has been increased demand for vibration motors that generate vibration when a user touches an LCD.

Particularly, vibration motors generating vibrations when touch screens are touched require the following characteristics. First, because the number of generation of vibrations is increased compared to that when incoming calls are received, the operational lifespan thereof must be increased. Second, response speed must be enhanced so that a user can feel vibrations in a timely manner when touching the screen.

Linear vibration motors are representative examples of vibration motors which can satisfy the above characteristics. Such linear vibration motors have a resonant frequency determined by a spring and a vibrator coupled to the spring and are vibrated by exciting force generated by electromagnetic force. The electromagnetic force is generated by interaction between a magnet of the vibrator and electric currents which are applied to a coil of a stator and have a predetermined frequency.

In conventional linear vibration motors having the above-mentioned construction, the vibrator collides with a casing or a bracket when it vibrates, thus generating contact noise. In an effort to overcome this problem, a damper (made of rubber, Poron, etc.) or an MF applied in an annular shape on a corresponding surface have been used.

However, in the case of the MF, when excessive force is applied thereto, it may be dispersed and displaced from the correct position, because it is liquid. Thus, the damping performance is deteriorated, resulting in generation of noise when the motor vibrates. Furthermore, damper made of made of rubber, Poron, etc. requires significant space so it is difficult to use in a limited space. Thus, the degree of freedom in motor design is reduced.

SUMMARY OF THE INVENTION

The present invention has been made in an effort to provide a linear vibration motor in which a damper is provided between an elastic member and a weight or between the elastic member and an inner surface of a casing, so that the damper can mitigate metallic high frequency noise attributable to friction between the elastic member and the weight or between the elastic member and the casing, and which can increase the spatial utilization, thereby enhancing the degree of design freedom in the linear vibration motor.

In a linear vibration motor according to an embodiment of the present invention, a stator includes a magnet. A vibrator includes a coil, a PCB, an elastic member and a damper. The coil is disposed at a position facing the magnet. A weight is coupled to the coil. The PCB has a first end connected to the coil, and a second end coupled to the stator. The elastic member has a first end coupled to stator, and a second end coupled to the coil. The damper is provided on an upper surface of the weight at a position facing the elastic member.

The stator may further include a bracket to which the PCB is fastened, and a casing having an internal space to cover the vibrator. The casing may be coupled to the bracket. The magnet may include a first magnet coupled to an upper-inner surface of the bracket at a position facing the weight, and a second magnet coupled to an upper-inner surface of the casing at a position facing the first magnet.

Furthermore, the same poles of the first and second magnets may face each other.

The stator may further include a plate yoke selectively coupled to an upper end of the first magnet or a lower end of the second magnet.

The PCB may include a mounting plate, an elastic part and a contact part. The mounting plate may be fastened to the stator. The elastic part may extend from the mounting plate in a spiral direction to provide elastic force. The contact part may be provided on an end of the elastic part. The contact part may be connected to the coil to apply external power to the coil.

The vibrator may further include a cylindrical yoke coupled between the coil and the weight to increase a magnetic flux of the magnet. The first end of the elastic member may be coupled to the stator. The second end of the elastic member may be coupled to the coil and the weight by the cylindrical yoke.

The weight may have a hollow opening so that the cylindrical yoke and the coil are located in the hollow opening.

The elastic member and the coil may have hollow openings so that the stator can be inserted into the elastic member and the coil while the elastic member and the coil linearly move.

The PCB may comprise an FPC (flexible PCB) having a predetermined elasticity.

In a linear vibration motor according to another embodiment of the present invention, a stator includes a casing, and a magnet fastened to an inner surface of the casing. A vibrator includes a coil, a PCB and an elastic member. The coil is disposed at a position facing the magnet. The weight is coupled to the coil. The PCB has a first end connected to the coil, and a second end coupled to the stator. The elastic member has a first end coupled to stator, and a second end coupled to the coil. A damper is provided on a lower surface of the casing at a position facing the elastic member.

The stator may further include a bracket to which the PCB is fastened. The bracket may be coupled to the casing. The casing may have an internal space to cover the vibrator. The magnet may include a first magnet and a second magnet. The first magnet may be coupled to an upper-inner surface of the bracket at a position facing the weight. The second magnet may be coupled to an upper-inner surface of the casing at a position facing the first magnet. The same poles of the first and second magnets may face each other.

The stator may further include a plate yoke selectively coupled to an upper end of the first magnet or a lower end of the second magnet.

The PCB may further include a mounting plate, an elastic part and a contact part. The mounting plate may be fastened to the stator. The elastic part may extend from the mounting plate in a spiral direction to provide elastic force. The contact part may be provided on an end of the elastic part. The contact part may be connected to the coil to apply external power to the coil.

The vibrator may further include a cylindrical yoke coupled between the coil and the weight to increase a magnetic flux of the magnet. The first end of the elastic member may be coupled to the stator. The second end of the elastic member may be coupled to the coil and the weight by the cylindrical yoke.

The weight may have a hollow opening so that the cylindrical yoke and the coil are located in the hollow opening The elastic member and the coil may have hollow openings so that the stator can be inserted into the elastic member and the coil while the elastic member and the coil linearly move.

In a linear vibration motor according to a further embodiment of the present invention, a stator includes a coil, and a PCB coupled to the coil. A vibrator includes a magnet, a yoke and an elastic member. The magnet is disposed at a position facing the coil. The yoke is coupled to the magnet. a weight is coupled to a circumferential outer surface of the yoke. The elastic member has a first end coupled to stator, and a second end coupled to the coil. A damper is selectively provided on an upper surface of the weight at a position facing the elastic member or on the stator at a position facing the elastic member.

The stator may further include a bracket and a casing. The PCB is fastened to the bracket. The casing has an internal space to cover the vibrator. The casing is coupled to the bracket. The damper is provided on a lower surface of the casing at a position facing the elastic member.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
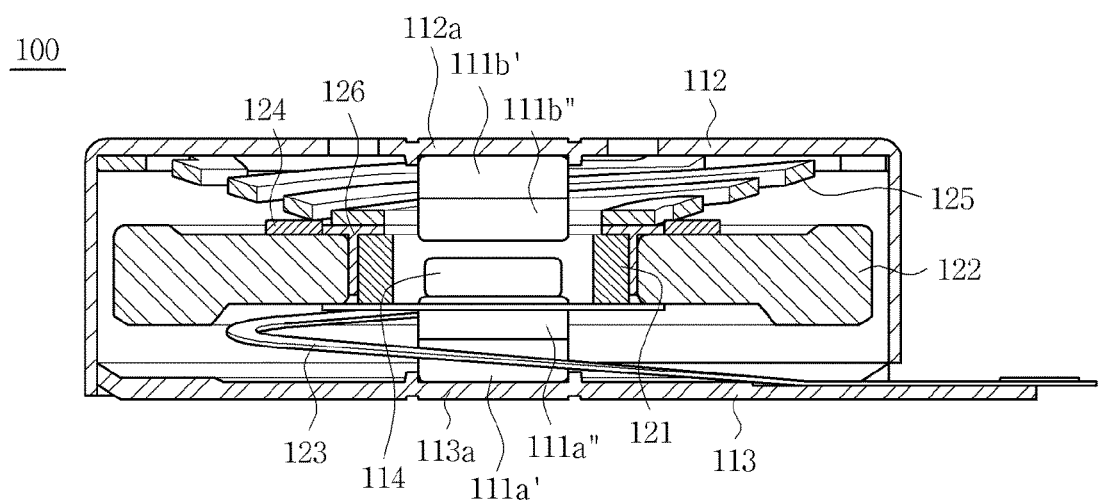
FIG. 1 is a sectional view showing a linear vibration motor, according to a first embodiment of the present invention.

Reference now should be made to the drawings, in which the same reference numerals are used throughout the different drawings to designate the same or similar components. In the following description, when it is determined that the detailed description of the conventional function and conventional structure would confuse the gist of the present invention, such a description may be omitted. Furthermore, it will be understood that, although the terms "first", "second" etc. may be used herein to describe various elements, components, regions, layers and/or sections, these elements, components, regions, layers and/or sections should not be limited by these terms. These terms are only used to distinguish one element, component, region, layer or section from another element, component, region, layer or section.

Hereinafter, embodiments of the present invention will be described in detail with reference to the attached drawings.

Figure 2:
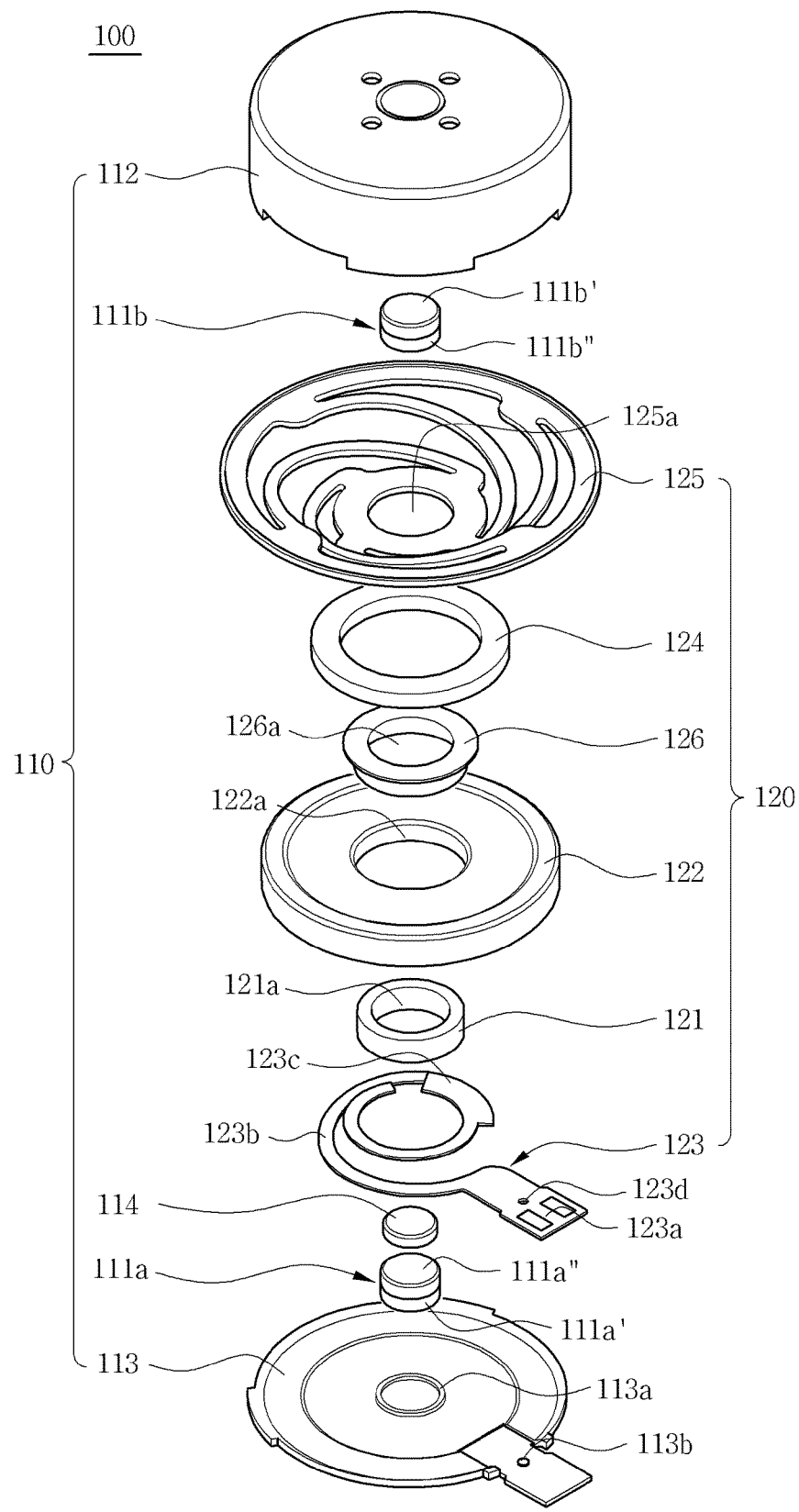
FIG. 2 is an exploded perspective view of the linear vibration motor of FIG. 1.

FIG. 1 is a sectional view showing a linear vibration motor 100, according to a first embodiment of the present invention. FIG. 2 is an exploded perspective view of the linear vibration motor 100 of FIG. 1. As shown in the drawings, the linear vibration motor 100 includes a stator 110 and a vibrator 120. The stator 110 includes magnets 111a and 111b, a casing 112, a bracket 113 and a plate yoke 114. The vibrator 120 includes a coil 121, a weight 122, a PCB (printed circuit board) 123, a damper 124, an elastic member 125 and a cylindrical yoke 126.

In detail, the casing 112 of the stator 110 has an internal space to cover the vibrator 120. The casing 112 is coupled to the bracket 113. The PCB 123 is also fastened to the bracket 113. The magnets 111a and 111b comprise a first magnet 111a which is attached to an inner surface of the bracket 113 at a position facing the weight 122, and a second magnet 111b which is attached to an inner surface of an upper plate of the casing 112 at a position facing the first magnet 111a. The first magnet 111a and the second magnet 111b are oriented such that the same poles face each other to enhance the magnetic efficiency. In other words, when the first magnet 111a includes an S pole 111a' and an N pole 111a" which are opposite each other, and the second magnet 111b also includes an S pole 111b' and an N pole 111b" which are opposite each other, the first magnet 111a and the second magnet 111b are oriented, for example, in such a way that the same N poles 111a" and 111b" face each other.

In the embodiment, the casing 112 and the bracket 113 respectively have, on central portions thereof, magnet seating portions 112a and 113a onto which the magnets 111a and 111b are attached.

The plate yoke 114 is selectively coupled to an upper end of the first magnet 111a or a lower end of the second magnet 111b.

The coil 121 of the vibrator 120 is located facing the magnets 111a and 11b. The weight 122 is coupled to the coil 121. A first end of the PCB 123 is connected to the coil 121 while a second end thereof is fastened to the bracket 113. Furthermore, a first end of the elastic member 125 is coupled to the casing 112 while a second end thereof is coupled to the coil 121. The damper 124 is disposed on the upper surface of the weight 122 that faces the elastic member 125.

The PCB 123 includes a mounting plate 123a, an elastic part 123b and a contact part 123c. The mounting plate 123a is fastened to the bracket 113. The elastic part 123b extends from the mounting plate 123a in a spiral direction to provide elastic force. The contact part 123c is provided on an end of the elastic part 123b and connected to the coil 121 to apply external power to the coil 121.

Furthermore, a fastening hole 123d is formed through the mounting plate 123a of the PCB 123, and a fastening protrusion 113b is provided on the bracket 113 at a position corresponding to the fastening hole 123d, so that the mounting plate 123a is fastened to the bracket 113 by fitting the fastening protrusion 113b into the fastening hole 123d. In the embodiment, the contact part 123c of the PCB 123 has a disk shape corresponding to the shape and size of the coil 121 which is brought into contact with the contact part 123c.

As such, the PCB 123 surrounds the circumference of the first magnet 111a, extends in a spiral shape, and comes into contact with the coil 121. Therefore, the PCB 123 elastically supports the entire vibrator 120 from the bottom of the vibrator 120. To achieve this purpose, the PCB 123 has a spring shape which extends in a spiral direction, and a coil spring shape.

The cylindrical yoke 126 is interposed between the coil 121 and the weight 122 to enhance the magnetic flux of the magnets 111a and 111b. Furthermore, a portion of, the cylindrical yoke 126 is coupled to the upper surface of the weight 122, and the other portion thereof is fitted into a hollow opening 122a of the weight 122.

Furthermore, the elastic member 125 is coupled to the coil 121 and the weight 122 by the cylindrical yoke 124.

The weight 122 has the hollow opening 122a, and the cylindrical yoke 126 and the coil 121 are located in the hollow opening 122a. Due to the hollow opening 122a, when the weight 122 carries out linear motion, the magnets 111a and 111b and the plate yoke 114 can be inserted into the weight 122.

In addition, the elastic member 125, the cylindrical yoke 126 and the coil 121 respectively have hollow openings 125a, 126a and 121a which allow the magnets 111a and 111b and the plate yoke 114 to be inserted into the elastic member 125, the cylindrical yoke 126 and the coil 121 while they carry out the linear motion.

The damper 124 according to the present invention is one element of the stator which has a predetermined damping coefficient. The characteristics of the motor can be improved by varying the elastic coefficient of the elastic member 125.

In the embodiment, the PCB 123 comprises an FPC (flexible PCB) having a predetermined elasticity.

In the first embodiment having the above-mentioned construction, when external power is supplied to the coil 121 through the PCB 123, the vibrator 120 linearly vibrates using electromagnetic force generated by the coil 121 and the magnets 111a and 111b. Even when the displacement of the vibrator 120 excessively increases, the damper 124 prevents the weight 122 from coming into direct contact with the elastic member 125. Hence, metallic high frequency noise attributable to friction between them can be mitigated. Furthermore, the present invention can increase spatial utilization, thus enhancing the degree of freedom in the motor design.

Figure 3:
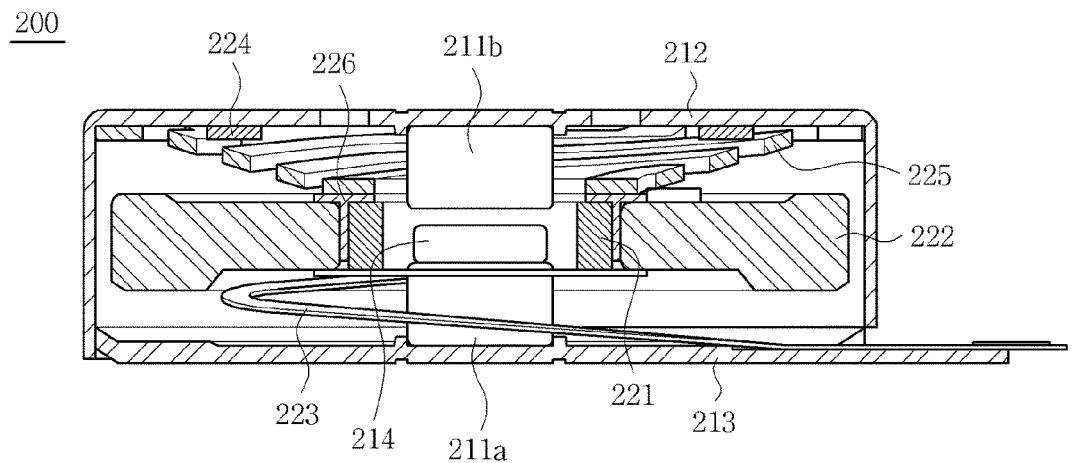
FIG. 3 is a sectional view showing a linear vibration motor, according to a second embodiment of the present invention.

FIG. 3 is a sectional view showing a linear vibration motor 200, according to a second embodiment of the present invention. As shown in the drawing, the linear vibration motor 200 includes a stator 210 and a vibrator 220. The stator 210 includes magnets 211a and 211b, a casing 212, a bracket 213 and a plate yoke 214. The vibrator 220 includes a coil 221, a weight 222, a PCB (printed circuit board) 223, a damper 224, an elastic member 225 and a cylindrical yoke 226. The general construction of the linear vibration motor 200 according to the second embodiment is the same as that of the linear vibration motor 100 of the first embodiment of FIG. 2, but only the installation location of the damper 224 differs between the first and second embodiments. Corresponding reference numerals will be used to designate the same or similar components.

The damper 224 of the vibrator 220 is attached to a lower surface of an upper plate of the casing 212 at a position facing the elastic member 225. Thus, when the vibrator 220 vibrates, metallic high frequency noise attributable to friction between the elastic member 125 and the casing 212 can be mitigated. The second embodiment of the present invention can also increase the spatial utilization, thus enhancing the degree of freedom in design of the motor.

In the second embodiment having the above-mentioned construction, when external power is supplied to the coil 221 through the PCB 223, the vibrator 220 linearly vibrates using electromagnetic force generated by the coil 221 and the magnets 211a and 211b. Even though the displacement of the vibrator 220 excessively increases, the damper 224 prevents the elastic member 225 from coming into direct contact with the casing 212, thus mitigating metallic high frequency noise attributable to friction between them. Furthermore, the spatial utilization is increased, thereby enhancing the degree of freedom in design of the motor.

TABLE 1

|  | No damper | damper |
| --- | --- | --- |
| Frequency | 202.7 Hz | 205.6 Hz |

As shown in Table 1, the vibration frequency for the linear vibration motor in FIG. 3 is 205.6 Hz while the vibration frequency for the linear vibration motor according to the prior art, which does not include damper, is 202.7 Hz. Conclusively, if the damper is included, the frequency is improved, thus the vibration also improves.

Figure 4:
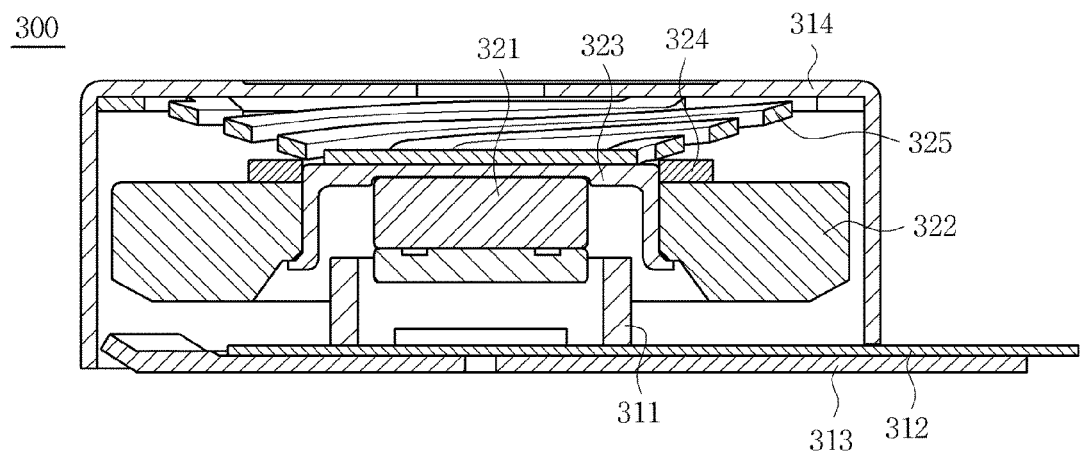
FIG. 4 is a sectional view showing a linear vibration motor, according to a third embodiment of the present invention.

FIG. 4 is a sectional view showing a linear vibration motor 300, according to a third embodiment of the present invention. As shown in the drawing, the linear vibration motor 300 includes a stator 310 and a vibrator 320. The stator 310 includes a coil 311, a PCB 312, a bracket 313 and a casing 314. The PCB 312 is connected to the coil 311 and fastened to the bracket 313. The casing 314 has an internal space to cover the vibrator 320 and is coupled to the bracket 313.

The vibrator 320 includes a magnet 321, a yoke 323, a weight 322, an elastic member 325 and a damper 324. The magnet 321 is disposed facing the coil 311. The yoke 323 is coupled to the magnet 321. The weight 322 is fitted over a circumferential outer surface of the yoke 323. A first end of the elastic member 325 is coupled to the stator 310 while a second end thereof is coupled to the yoke 323. The damper 324 is provided on the upper surface of the weight 322 that faces the elastic member 325.

In the third embodiment having the above-mentioned construction, when external power is supplied to the coil 311 through the PCB 312, the vibrator 320 linearly vibrates using electromagnetic force generated by the coil 311 and the magnet 321. Even though the displacement of the vibrator 320 excessively increases, the damper 324 prevents the weight 322 from coming into direct contact with the elastic member 325, thus mitigating metallic high frequency noise attributable to friction between them. Furthermore, the spatial utilization is increased, thereby enhancing the degree of freedom in design of the motor.

Figure 5:
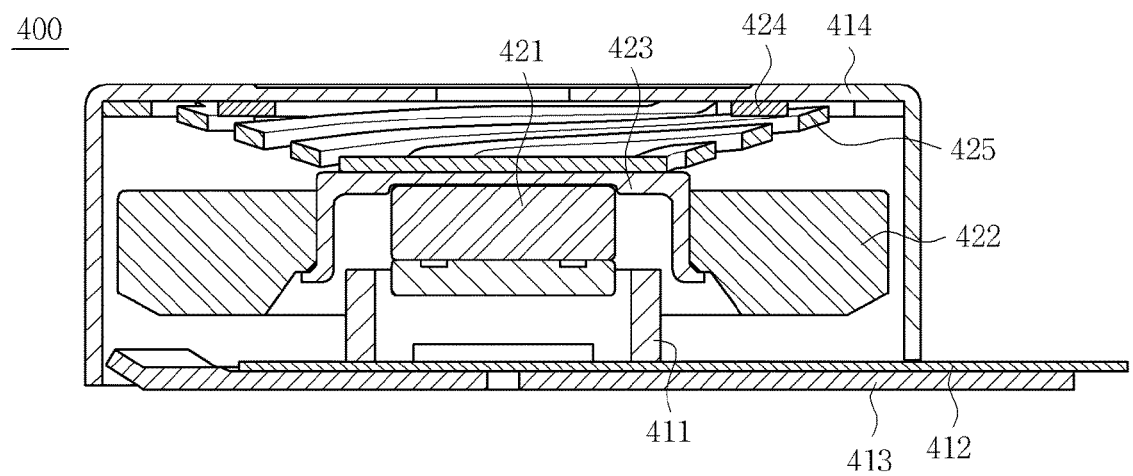
FIG. 5 is a sectional view showing a linear vibration motor, according to a fourth embodiment of the present invention.

FIG. 5 is a sectional view showing a linear vibration motor 400, according to a fourth embodiment of the present invention. As shown in the drawing, the linear vibration motor 400 includes a stator 410 and a vibrator 420. The stator 410 includes a coil 411, a PCB 412, a bracket 413, a casing 414 and a damper 424. The PCB 412 is connected to the coil 411 and fastened to the bracket 413. The casing 414 has an internal space to cover the vibrator 420 and is coupled to the bracket 413. The damper 424 is attached to a lower to surface of an upper plate of the casing 414.

The vibrator 420 includes a magnet 421, a yoke 423, a weight 422 and an elastic member 425. The magnet 421 is disposed facing the coil 411. The yoke 423 is coupled to the magnet 421. The weight 422 is fitted over a circumferential outer surface of the yoke 423. A first end of the elastic member 425 is coupled to the stator 410 while a second end thereof is coupled to the yoke 423.

In the fourth embodiment having the above-mentioned construction, when external power is supplied to the coil 411 through the PCB 412, the vibrator 420 linearly vibrates using electromagnetic force generated by the coil 411 and the magnet 421. Even though the displacement of the vibrator 420 excessively increases, the damper 424 prevents the elastic member 425 from coming into direct contact with the casing 414, thus mitigating metallic high frequency noise attributable to friction between them. Furthermore, the spatial utilization is increased, thereby enhancing the degree of freedom in design of the motor.

Although the embodiments of the present invention have been disclosed for illustrative purposes, it will be appreciated that the linear vibration motor according to the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

As described above, in a linear vibration motor according to the present invention, a damper is provided between an elastic member and a weight or between the elastic member and an inner surface of a casing. Thus, the damper can mitigate metallic high frequency in noise attributable to friction between the elastic member and the weight or between the elastic member and the casing. Furthermore, the present invention can increase the spatial utilization, thereby enhancing the degree of freedom in design of the linear vibration motor.

What is claimed is:

1. A linear vibration motor, comprising:
    a stator having an internal space, with a magnet mounted to the stator;
    a vibrator comprising a coil disposed at a position facing the magnet, the vibrator being received in the internal space of the stator;
    an elastic member connecting the stator to the vibrator;
    a damper provided on a surface of the stator, the surface facing the elastic member; and
    a PCB (Printed Circuit Board) having a first end connected to the coil, and a second end coupled to the stator, the PCB comprising:
        a mounting plate fastened to the stator;
        an elastic part extending from the mounting plate in a spiral direction to provide elastic force; and
        a contact part provided on an end of the elastic part, the contact part being connected to the coil to apply external power to the coil,
    wherein at least a part of the elastic member is located between the damper and the vibrator in order that the elastic member prevents the vibrator from directly contacting with the damper, and at least a part of the damper is disposed at a position facing an end surface of the vibrator, in a vibrating direction.

2. The linear vibration motor as set forth in claim 1, wherein the stator comprises:
    a casing defining the internal space containing the vibrator therein, the casing being open on a lower end thereof; and
    a bracket closing the internal space of the casing, and
    the damper is provided on a surface of the casing, the surface facing the elastic member.

3. The linear vibration motor as set forth in claim 2, wherein the magnet is mounted to either or both the casing and the bracket.

4. The linear vibration motor as set forth in claim 3, wherein either or each of the casing and the bracket has a magnet seating portion to which the magnet is mounted.

5. The linear vibration motor as set forth in claim 1, wherein a plate yoke is coupled to a surface of the magnet.

6. The linear vibration motor as set forth in claim 1, wherein the coil is hollow so that the magnet passes through the coil.

7. The linear vibration motor as set forth in claim 1, wherein the vibrator further comprises:
    a weight moving along with the coil.

8. The linear vibration motor as set forth in claim 1, wherein a yoke is provided on the weight, and
    a first end of the elastic member is coupled to the stator, and
    a second end of the elastic member is coupled to the yoke.

9. The linear vibration motor as set forth in claim 7, wherein a first end of the elastic member is coupled to the stator, and a second end of the elastic member is coupled to the coil.

10. The linear vibration motor as set forth in claim 2, wherein the magnet comprises:
    a first magnet coupled to a surface of the bracket; and
    a second magnet coupled to a surface of the casing, the second magnet facing the first magnet.

11. The linear vibration motor as set forth in claim 10, further comprising:
    a plate yoke coupled to a surface of the first magnet or a surface of the second magnet.

* * * * *